United States Patent Office 2,735,864
Patented Feb. 21, 1956

2,735,864

PREPARATION OF 2,3,4-TRIHYDROXYALKANE-NITRILES

Curtis W. Smith and Roy T. Holm, Berkeley, Calif., assignors to Shell Development Company, Emeryville, Calif., a corporation of Delaware No Drawing. Application May 29, 1953,
Serial No. 358,568

9 Claims. (Cl. 260—465.6)

This invention relates to the production of valuable polyhydroxy compounds and relates more particularly to the production of polyhydroxy mononitriles.

Polyhydroxy nitriles containing at least three hydroxy groups and the ester derivatives thereof are of interest as starting and intermediate materials in the production of valuable chemical derivatives therefrom. The esters of polyhydroxy nitriles may be employed in the production of such materials, as, for example, plasticizers, insecticides, stabilizers and the like.

Methods available heretofore for the production of polyhydroxy nitriles are often sufficiently complex and costly to militate against their practical scale utilization. Some of these rely upon the use as starting materials of compounds which either are generally not readily available or properties of which render their use in the process economically unattractive. Certain organic compounds which contain at least one olefinic double bond, that is, a double bond between two carbon atoms of aliphatic character can be reacted with hydrogen peroxide under particular conditions to form polyhydroxy compounds by addition of two hydroxy groups in the double bond. In the case of unsaturated fatty acids and their esters the reaction often proceeds easily in the absence of a substantial degree of undesired side reactions, such as oxidation. With oxidation-susceptible olefinic compounds which do not contain a

group, however, the reaction is often difficult to carry out efficiently without the formation of substantial amounts of undesirable by-products, and then generally proceeds so slowly that its use on a practical scale is precluded. An electro-negative group attached directly to the carbon atom which is linked to the unsaturated carbon atom, as in alpha, beta-unsaturated aldehydes such as acrolein, interferes with the reactivity of the unsaturated double bond. The use of catalysts enables the reaction to proceed to some extent. Even with the best of these catalysts, however, the reaction rate is generally below that commensurate with practical scale operation and side reaction to an inordinate degree are usually still encountered. Increasing the severity of the operating conditions, for example, by the use of a relatively high temperature, generally results in an increase in the rate of by-product formation offsetting any advantage otherwise inherent therein.

It has been found that quite contrary to the behavior of unsaturated compounds of the type of alpha, beta-unsaturated aldehydes, such as acrolein, the unsaturated compounds wherein an electro-negative group is attached to a carbon removed by at least one carbon atom from the unsaturated carbon atom lend themselves to direct hydroxylation with suitable hydroxylating agents. It has furthermore been found that the linkage of a hydroxyl group to the carbon atom intervening between the unsaturated carbon atom and the carbon atom having the electro-negative group linked directly thereto, as, for example, in the beta, gamma-unsaturated alpha-hydroxy nitriles, such as 2-hydroxy-3-butenenitrile, minimizes still further any adverse effect of the electro-negative group upon the ability of the double bond to enter into the direct hydroxylation reaction.

In accordance with the present invention valuable polyhydroxy nitriles are obtained efficiently from readily available olefinic starting materials such as, derivatives of readily available olefinic hydrocarbons containing a negative group directly attached to the carbon atom which is in turn linked directly to the unsaturated carbon atom, such as, for example, the alpha, beta-unsaturated aliphatic aldehydes as acrolein, crotonaldehyde, alpha, beta-dimethylacrolein, etc., by converting these compounds to the corresponding unsaturated cyanohydrin and thereafter converting the unsaturated cyanohydrin to the desired polyhydroxy nitriles and esters thereof as described herein.

Conversion of the alpha,beta-unsaturated aliphatic aldehydes, such as, for example, acrolein, methacrolein, crotonaldehyde, alpha,beta-dimethylacrolein, alpha,methyl,beta-ethylacrolein, etc., to the corresponding unsaturated cyanohydrin may be carried out under conditions heretofore disclosed.

Although the present invention thus enables the conversion of readily available materials such as, for example, the alpha,beta-unsaturated aldehydes, to valuable polyhydroxy nitriles by first converting them to the corresponding unsaturated cyanohydrin, it is in no wise limited to the use of unsaturated cyanohydrins obtained from any single source. In accordance with the invention reaction mixtures comprising substantial amounts of polyhydroxy nitriles are obtained by reacting a beta,gamma-unsaturated-alpha-hydroxy-nitrile having at least four carbon atoms to the molecule, regardless of the source of the unsaturated nitrile, with a hydroxylating agent such as, for example, hydrogen peroxide, or a compound providing hydrogen peroxide, under the hydroxylating reaction conditions.

The class of beta,gamma-unsaturated-alpha-hydroxy-nitriles, members of which are employed as starting materials in the production of polyhydroxy nitriles in accordance with the invention may be represented by the empirical formula:

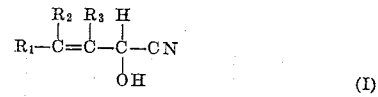

wherein $R_1$, $R_2$ and $R_3$ each represent the same or a different member of the group consisting of hydrogen and hydrocarbyl radicals including alkyl, cycloalkyl, aryl, aralkyl groups. The lowest member of the class of compounds defined by the foregoing empirical Formula I is 2-hydroxy-3-butenenitrile (acrolein cyanohydrin). Other examples of members of the group of cyanohydrins defined by the foregoing Formula I are 2-hydroxy-3-pentenenitrile,
2-hydroxy-3-methyl-3-pentenenitrile,
2-hydroxy-3-methyl-3-hexenenitrile,
2-hydroxy-3-hexenenitrile,
2-hydroxy-3-octenenitrile, and their homologues. Preferred compounds of the defined class of beta,gamma-unsaturated-alpha-hydroxy-nitriles are those containing from four to fourteen carbon atoms to the molecule.

Polyhydroxy nitriles are obtained in accordance with the present invention by reacting members of the above-defined class of unsaturated cyanohydrins (beta,gamma-unsaturated-alpha-hydroxynitriles) with a suitable hydroxylating agent. As hydroxylating agent it is preferred to employ hydrogen peroxide. The hydrogen peroxide may be employed as such or in the form of suitable solutions thereof, such as, for example, aqueous solutions containing from 30 to 90% hydrogen peroxide. The ratio of hydroxylating agent, such as hydrogen peroxide, to unsaturated cyanohydrin reactant, may vary considerably within the scope of the invention. A mole ratio of hydrogen peroxide to the cyanohydrin in a range of from about 0.5:1 to 5:1 is found suitable. The use of the hydroxylating agent in a mole ratio of hydroxylating agent to cyanohydrin in the range of from about 1:1 to 2:1 is preferred. Hydroxylating agents other than hydrogen peroxide may be employed within the scope of the invention. As such hydroxylating agents any agents may be employed capable of providing hydrogen peroxide under the reaction conditions or the use of which results in the provision of hydroxyl ions capable of reacting with the unsaturated cyanohydrin charge. Further examples of suitable hydroxylating agents comprise the organic peroxide hydroxylating agents such as hydrocarbon peroxides exemplified by tert.butylhydroperoxide and triacetoneperoxide, perbenzoic acids, persulfates, and the like.

The hydroxylation reaction is preferably carried out in the presence of a suitable hydroxylation catalyst. As hydroxylation catalyst there may be employed any of the hydroxylation catalysts heretofore disclosed. Preferred are the oxides of the heavy metals, such as the oxides of tungsten, molybdenum, chromium, vanadium, manganese, cobalt, osmium, and the like. Particularly preferred are the oxides of tungsten, molybdenum, vanadium and osmium. The metal oxide catalysts may be employed as such, or may be introduced into the reaction zone in the form of their acids. Preferred hydroxylation catalysts comprise, for example, tungstic or molybdic acid or any of the heteropoly tungstic acids and heteropoly molybdic acids, osmium tetroxide, etc. Two or more hydroxylation catalysts may be employed. The hydroxylation catalyst used may comprise oxides of different metals as well as mixtures of oxides and heteropoly acids of the same or different metals. The quantity of hydroxylation catalyst employed is not critical. In general, the use of the hydroxylation catalyst in the range of, for example, from about 0.1% to about 5% based on total reaction mixture will be found suitable.

Hydroxylation of the cyanohydrins in accordance with the invention may be carried out in the temperature range of from about 0° C. to about 100° C. and preferably from about 40° C. to about 75° C. The particular temperature preferably employed will depend to some extent upon the specific unsaturated cyanohydrin employed as charge. When reacting a cyanohydrin having from four to about six carbon atoms to the molecule a temperature in the range of from about 20 to about 70° C., preferably from about 40 to about 60° C., is employed. In a preferred method the hydroxylation reaction is initiated at a lower temperature within the foregoing prescribed range and thereafter completed at a higher temperature. Thus, the reaction mixture may be heated in the lower range to a maximum temperature not exceeding about 50° C. until at least a substantial portion, for example, from about 50 to about 80% of the unsaturated cyanohydrin charge has undergone reaction. Thereafter the reaction is completed at a temperature above about 50° C. but below about 100° C.

The reaction is preferably carried out in the presence of a suitable diluent. As diluents there may be employed materials which are inert and liquid under the conditions of executing the reaction and capable of functioning as dispersing media for the reaction components and catalysts employed. Liquids capable of functioning as solvents for the reactants and which are inert under the reaction conditions are generally preferred. A suitable diluent is water. The diluent, such as water, is preferably added in substantial excess to enable the reaction to proceed in a relatively dilute solution. Examples of diluents other than water which may suitably be employed within the scope of the invention comprise, for example, the tertiary aliphatic alcohols, such as, for example, tertiary butyl alcohol and other organic liquids which are inert and stable under the reaction conditions. The reaction may optionally be carried out in the presence of added amounts of carboxylic acids, such as, for example, acetic acid.

The process of the invention is executed in the liquid phase. Subatmospheric, atmospheric or superatmospheric pressures capable of maintaining at least a substantial part of the reactants in the liquid phase may be employed. In general, the use of pressures ranging from about atmospheric to slightly superatmospheric pressures has been found satisfactory.

Under the above-defined conditions the unsaturated cyanohydrin will be hydroxylated with the formation of reaction products comprising polyhydroxy saturated nitriles. Thus, a 2-hydroxy-3-alkenenitrile is converted to the corresponding 2,3,4 - trihydroxyalkanenitrile. Specifically, 2-hydroxy - 3 - butenenitrile (acrolein cyanohydrin) will be converted to a reaction mixture comprising 2,3,4-trihydroxy-butyronitrile. Similarly, 2,3,4-trihydroxyvaleronitrile,
2,3,4-trihydroxycapronitrile,
2,3,4-trihydroxyoenanthronitrile,
2,3,4-trihydroxycaprilonitrile,
2,3,4-trihydroxypelargonitrile,
2,3,4-trihydroxycapricnitrile, and
2,3,4-trihydroxyundeconitrile, are obtained in accordance with the process of the invention from the corresponding 2-hydroxy-3-alkenenitriles.

The reaction mixture obtained in accordance with the process of the invention may be subjected to suitable product recovery means to enable the separation therefrom of the desired polyhydroxy nitrile. Such recovery means may comprise one or more such steps as, for example, distillation, extractive distillation, solvent extraction, filtration, and the like. Product recovery means employed comprise suitable means for the removal of the catalyst from the reaction mixture as, for example, by acidification followed by filtration. Material lower boiling than the desired nitrile may then be distilled from the resulting filtrate at subatmospheric pressures. It is to be understood that the invention is in no wise limited to the use of any specific method for the separation of polyhydroxy nitriles from the resulting reaction mixtures.

Poly-esters, such as the poly-carboxylic acid esters of the polyhydroxy nitriles obtained in accordance with the process of the invention, are of particular value in many fields of application. Product recovery means may be combined with steps resulting in the recovery of the polyhydroxy nitriles in the form of their carboxylic acid esters. If desired, hydroxylation of the unsaturated alpha-hydroxy nitriles may be carried out in the presence of added carboxylic acid, for example, an aliphatic monocarboxylic acid, such as acetic acid, or homologues thereof, to result in the esterification of at least a substantial part of the polyhydroxy nitriles substantially as rapidly as formed in the hydroxylating zone. Conversion of polyhydroxy nitriles, produced in accordance with the invention, to the corresponding carboxylic acid esters thereof may, however, be carried out by reacting the polyhydroxy nitriles with the suitable carboxylic acid under esterifying conditions. The polyhydroxy nitrile thus esterified may be employed in relatively pure state, or in the crude state consisting essentially of the polyhydroxy nitrile-containing reaction mixture obtained in accordance with the present invention. Esterifying conditions employed comprise temperatures in the range of, for example, from about room temperature to about 150° C., and preferably from about 75 to about 100° C. Conventional esterification catalysts, such as, for example, mineral acids, such as sulfuric acid and the like, may be employed. Under the esterifying conditions the 2,3,4-polyhydroxy nitriles obtained in accordance with the invention are converted to the corresponding tri-esters thereof. Thus, esterification of 2,3,4-trihydroxy butyronitrile with acetic anhydride at a temperature in the range of from about 75 to about 100° C. resulted in the obtaining of a reaction mixture comprising 2,3,4-tri-acetoxy-butyronitrile. Similarly, 2,3,4-butyroxy-butyronitrile is obtained by esterifying 2,3,4-trihydroxy-butyronitrile with butyric acid; and the 2,3,4-acetoxy esters of valeronitrile, capronitrile, oenanthonitrile, caprilonitrile, pelargonitrile, capricnitrile, undeconitrile, by esterification with acetic acid of the corresponding 2,3,4-trihydroxynitrile.

The following examples are illustrative of the invention:

*Example I*

An admixture consisting of 83 parts of 2-hydroxy-3-butenenitrile (acrolein cyanohydrin), 670 parts of water and 4 parts of tungstic acid (all parts by weight) was heated to 50° C. with stirring. A 33.6% aqueous solution of hydrogen peroxide was added slowly to the admixture while maintaining the temperature at 50° C. The hydrogen peroxide addition was completed in 15 minutes. The mole ratio of added hydrogen peroxide to 2-hydroxy-3-butenenitrile charged was 0.5. The mixture was heated at a temperature of 50 to 55° C. for a period of 5 hours. After standing at room temperature the water was distilled from the resulting reaction mixture at 50 mm. Hg resulting in the obtaining of a distillation residue consisting essentially of 2,3,4-trihydroxybutyronitrile.

Forty-five parts by weight of the distillation residue (2,3,4-trihydroxybutyronitrile) thus obtained as described in the foregoing, was combined with 150 parts by weight of acetic anhydride. The resulting mixture was heated on a steam bath for 6 hours. Excess acetic anhydride was thereafter removed from the resulting reaction mixture by flashing under reduced pressure. The resulting residue was dissolved in benzene, washed successively with sodium bicarbonate solution and water, dried and filtered. Residual benzene was flashed off and the resulting residue was subjected to distillation under reduced pressure. The fraction taken overhead at a temperature range of 101 to 130° C. at 0.07–0.17 mm. Hg was found to consist essentially of the triacetate of 2,3,4-trihydroxybutyronitrile. Results obtained by analysis of the fraction thus taken overhead are set forth in the left hand column of the following table. Corresponding values calculated for $C_{10}H_{13}NO_6$ are listed for the purpose of comparison in the right hand column of the following table.

|  | Found by Analysis | Calculated for $C_{10}H_{13}NO_6$ |
|---|---|---|
| Carbon, Percent | 49.33 | 49.38 |
| Hydrogen, Percent | 5.39 | 5.39 |
| Nitrogen, Percent | 6.14 | 5.76 |
| Nitrile value, eq./100 g | 0.415 | 0.411 |

*Example II*

One hundred sixty-six parts of 2-hydroxy-3-butenenitrile, 1,340 parts of water and 8 parts of tungstic acid (all parts by weight) were mixed. The mixture was heated to 50° C. while stirring. An amount of 34% aqueous solution of hydrogen peroxide was poured into the mixture to result in a molar ratio of hydrogen peroxide to 2-hydroxy-3-butenenitrile charged of 1. The resulting mixture was heated at 50° C. for 2 hours and thereafter at 60° C. for 5 hours. After standing at room temperature the mixture was distilled to a maximum kettle temperature of 90° C. at 20 mm. Hg. Two hundred nineteen parts by weight of a viscous syrup obtained as residue in the distillation was found upon analysis to consist essentially of 5% 2-hydroxy-3-butenenitrile and 95% trihydroxybutyronitrile.

The invention claimed is:

1. The process for the production of trihydroxyalkanenitriles having at least four carbon atoms to the molecule which comprises reacting a beta,gamma-unsaturated-alpha-hydroxyalkenenitrile having at least four carbon atoms to the molecule with a hydroxylating agent in the presence of a hydroxylation catalyst.

2. Process according to claim 1 wherein said hydroxylating agent is hydrogen peroxide and said hydroxylation catalyst is a metal oxide hydroxylation catalyst.

3. Process in accordance with claim 1 wherein said hydroxylation catalyst is tungstic acid.

4. The process for the production of reaction mixtures comprising 2,3,4-trihydroxyalkanenitriles which comprises reacting 2-hydroxy-3-alkenenitrile with a hydroxylating agent in the presence of a hydroxylation catalyst.

5. The process for the production of reaction mixtures comprising 2,3,4-trihydroxyalkanenitriles which comprises reacting 2-hydroxy-3-alkenenitrile with hydrogen peroxide in the presence of a metal oxide hydroxylation catalyst.

6. Process in accordance with claim 5 wherein said metal oxide hydroxylation catalyst is tungstic acid.

7. Process for the production of 2,3,4-trihydroxybutyronitrile which comprises reacting 2-hydroxy-3-butenenitrile with a hydroxylating agent in the presence of hydroxylation catalyst.

8. Process for the production of reaction mixtures comprising 2,3,4-trihydroxybutyronitrile which comprises reacting 2-hydroxy-3-butenenitrile with hydrogen peroxide in the presence of a metal oxide hydroxylation catalyst.

9. Process in accordance with claim 8 wherein said hydroxylation catalyst is tungstic acid.

References Cited in the file of this patent

UNITED STATES PATENTS

| 2,373,942 | Bergsteinsson | Apr. 17, 1945 |
| 2,379,297 | Harmon et al. | June 26, 1945 |
| 2,402,566 | Milas | June 25, 1946 |
| 2,476,026 | Clifford et al. | July 12, 1949 |
| 2,500,599 | Bergsteinsson | Mar. 14, 1950 |

OTHER REFERENCES

Fischer: Beilstein's Handbuch der Organischen Chemie, 4th ed., vol. 10, 1st suppl. page 250.